United States Patent [19]

Swim, Jr.

[11] Patent Number: 5,066,172
[45] Date of Patent: Nov. 19, 1991

[54] COUNTERSINK TOOL ASSEMBLY

[76] Inventor: Ollie C. Swim, Jr., 18255 Westmore, Livonia, Mich. 48152

[21] Appl. No.: 560,364

[22] Filed: Jul. 31, 1990

[51] Int. Cl.$^5$ .............................................. B23B 51/00
[52] U.S. Cl. .................................... 408/1 R; 408/113; 408/202
[58] Field of Search ................. 408/1 R, 17, 113, 117, 408/118, 202, 200, 203, 224, 241 S

[56] References Cited

U.S. PATENT DOCUMENTS

| | | |
|---|---|---|
| 332,308 | 12/1885 | Valentine. |
| 631,572 | 8/1899 | Judson. |
| 2,317,615 | 4/1943 | Johnson .............................. 408/202 |
| 2,344,143 | 3/1944 | Harding .............................. 408/202 |
| 2,422,279 | 6/1947 | Zimmer .............................. 408/113 |
| 3,104,563 | 9/1963 | Gulley. |
| 3,877,099 | 4/1975 | Halpern .......................... 408/117 X |
| 4,580,933 | 4/1986 | Wilkins .............................. 408/118 |
| 4,869,625 | 9/1989 | Stone .................................. 408/118 |

FOREIGN PATENT DOCUMENTS

| | | | |
|---|---|---|---|
| 590010 | 1/1960 | Canada ................................ 408/202 |
| 915171 | 7/1949 | Fed. Rep. of Germany ...... 408/200 |
| 302233 | 12/1954 | Switzerland ........................ 408/202 |

Primary Examiner—Daniel W. Howell
Attorney, Agent, or Firm—Harness, Dickey & Pierce

[57] ABSTRACT

The countersink tool assembly of the present invention is rotatably driven by a conventional drill apparatus and includes an insert having a central aperture and two diametrically opposed ears which extend into the central aperture. A multi-fluted countersink tool is concentrically mounted within the aperture such that the diametrically opposed ears extend into the flutes of the countersink tool at a desired axial location. The ears are adapted to engage and follow the contour of the curved outer wall surface which concentrically surrounds the hole. As such, the countersink tool assembly translates rectilinearly with respect to corresponding changes in the curved contour of the outer wall surface.

13 Claims, 1 Drawing Sheet

COUNTERSINK TOOL ASSEMBLY

BACKGROUND AND SUMMARY OF THE INVENTION

The present invention relates generally to countersink tools, and more particularly, to a countersink tool assembly for chamfering bores in rounded parts.

Many machined parts require that drilled holes or bores be countersunk. A countersink or "chamfer" is a frusto-conically tapered enlargement at the opening of the hole which is adapted for receiving the head of a fastener, for receiving a center, or for deburring the hole itself. The tapered surface is concentric with the hole and extends at an angle of less than 90° to the center line of the hole. Typically, holes are countersunk in one of two methods. According to the first method, the holes are first drilled and then countersunk or "chamfered" with a separate countersink tool. The second method employs countersink tools which are a combination of a twist drill and a countersink tool. As such, both the hole and the chamfer are cut during the same operation.

Unfortunately, a common problem associated with countersinking holes drilled into a rounded surface is that the resulting chamfered surface has an irregular cross-section around the circumference of the hole. Therefore, a drill operator must manipulate the countersink tool with respect to the centerline of the hole for changing the angular relationship therebetween in an effort to compensate for the rounded surface contour. Such manual manipulation is undesirable in that the countersunk surface has poor dimensional accuracy and cannot be repetitively produced in an automated manufacturing environment.

Accordingly, the present invention overcomes the disadvantages associated with using conventional countersink tools and provides a countersink tool assembly adapted for cutting a tapered countersunk surface having a generally uniform cross-section around the entire circumference of the hole.

More specifically, the countersink tool assembly of the present invention which is rotatably driven by a conventional drill apparatus, includes an insert having a central aperture and two diametrically opposed ears which extend into the central aperture. A multi-fluted countersink tool is concentrically mounted within the aperture such that the diametrically opposed ears extend into the flutes of the countersink tool at a desired axial location. The ears are adapted to engage and follow the contour of the curved outer wall surface which concentrically surrounds the hole. As such, the countersink tool assembly translates rectilinearly with respect to corresponding changes in the curved contour of the outer wall surface. In this manner, holes drilled into spherical, cylindrical or other curved surfaces can be countersunk to produce a uniform conical chamfer around the entire circumference of the hole.

Additional objects, advantages, and features of the present invention will become apparent from the following description and appended claims, taken in conjunction with the accompanying drawings.

DESCRIPTION OF THE PREFERRED EMBODIMENT

Figure 1:
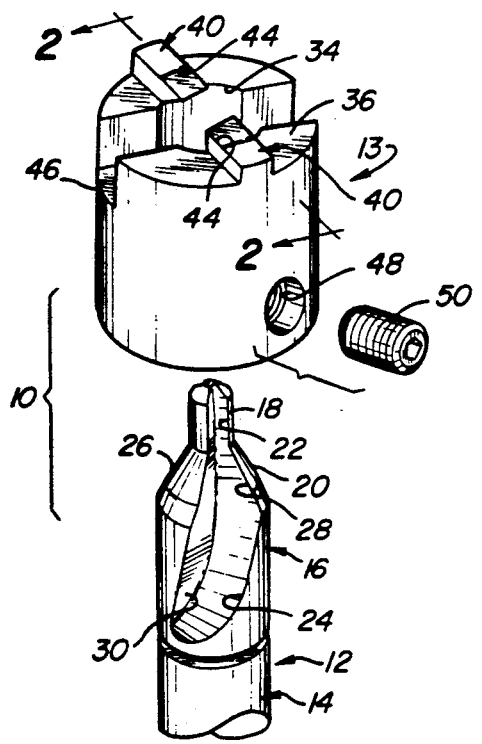
FIG. 1 is an exploded perspective view of the countersink tool assembly according to the present invention.
Figure 2:
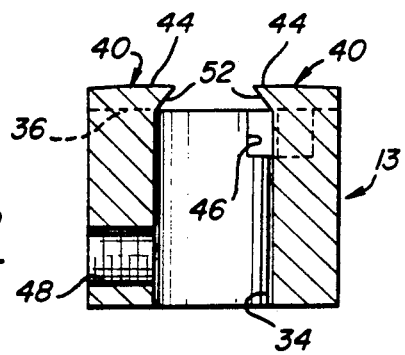
FIG. 2 is a cross-sectional view of the insert taken along line 2—2 of FIG. 1.
Figure 3:
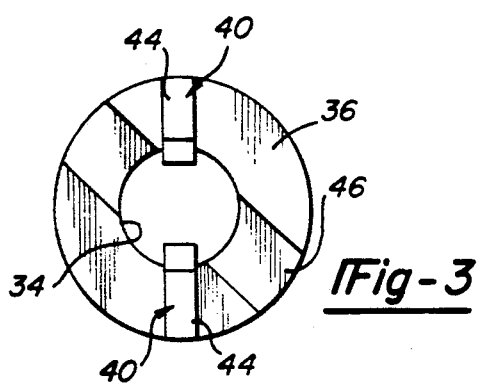
FIG. 3 is a top view of the insert of FIG. 1.

For the purposes of promoting and understanding the principles of the present invention, reference will now be made to an embodiment illustrated in the drawings and specific language will be used to describe the same. It will nevertheless be understood that the embodiment illustrated is merely exemplary and is not intended to limit the scope of the invention.

Referring now to the drawings, a novel countersink tool assembly 10 is shown which is especially suited for cutting a uniformly tapered chamfer in holes or bores drilled through or into rounded surfaces. In general, countersink tool assembly 10 includes a chamfer cutting tool or countersink 12 and an insert 13 concentrically secured thereon. Countersink 12 has a shank portion 14 and a cutter portion 16. Shank portion 14 is adapted to be secured in any conventional manner to the spindle or chuck of a power-driven drill apparatus so as to be rotatably driven thereby.

In general, cutter portion 16 of countersink 12 is shown to form a two fluted combination countersink and drill tool. More specifically, cutter portion 16 of countersink 12 includes a twist drill 18 and a countersink tool 20. Twist drill 18 has two "cutting" edges 22 (one shown), one at each of two flutes 24, which are shown to be generally of a semi-elliptic spiral configuration. As is known in the art, countersink 20 is a generally conical tapered surface 26, formed between twist drill and shank 14 which defines the desired chamfer angle for enlargement of the bore drilled by twist drill 18. Countersink has two "cutting" edges 28 (one shown) which are common with the "cutting" edges 22 of twist drill 18. As is shown, the portions of flutes 24 associated with countersink 20 are spirally formed for providing a chip clearance channel 30. While the exemplary embodiment illustrates use of combination countersink 12, it will be appreciated that the principles of the present invention are readily adaptable for application with virtually any suitable multi-fluted countersink tools.

Insert 13 of countersink tool assembly 10 has a central aperture 34 extending therethrough. Central aperture 34 is of a diameter sufficient to concentrically receive shank 14 of countersink 12 therein. Extending from a generally transverse forward surface 36 of insert 13 are two diametrically opposed tabs or ears 40. Ears 40 extend radially inwardly into central aperture 34 so as to project into flutes 24 of countersink 12. In particular, outermost planar surfaces 44 of ears 40 defines contact surfaces which are adapted to engage and maintain contact with the contoured (i.e., rounded) surface which concentrically surrounds the drilled bore or hole. More specifically, planar contact surfaces 44 on ears 40 define a line of contact with diametrically opposed points on the contoured workpiece surface such that the axis of rotation of countersink 12 is colinear with a center line of the drilled hole.

Insert 13 includes a chip clearance slot 46 formed in front surface 36 which extends across the entire diameter of insert 13. A transverse threaded bore 48 extends through insert 13 and intercepts central aperture 34 such that a set screw 50 is tightened onto shank 14 to hold insert 13 in the proper axial position relative to cutter portion 16 of countersink tool 12.

As is apparent, countersink 12 may only be inserted into insert 13 with ears 40 radially inwardly disposed within flutes 24 since the outwardly converging edge surface 52 of ears 40 extend into aperture 34.

Figure 4A:
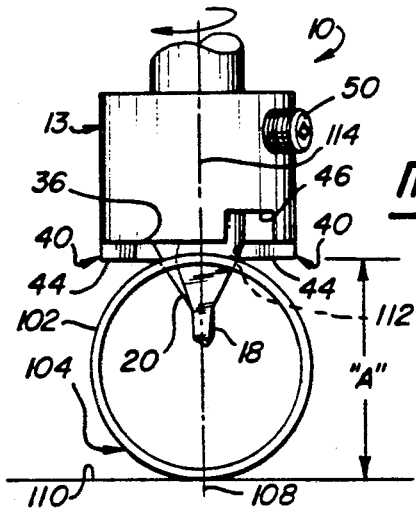
FIGS. 4A and 4B schematically depict the present invention operatively cutting a countersunk surface in a cross-hole drilled through an exemplary cylindrical tubular workpiece.
Figure 4B:
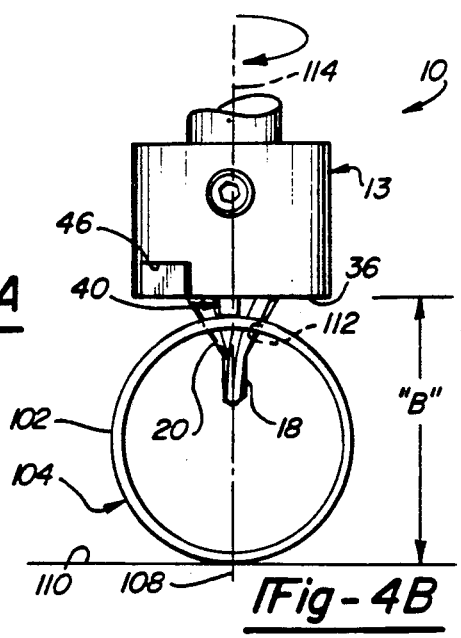

Referring now to FIGS. 4A and 4B, countersink tool assembly 10 is shown in operative relation with a workpiece 104 having a rounded external surface. According to the exemplary workpiece shown, countersink tool assembly 10 is adapted to be rotatably driven by a conventional power-driven drill apparatus for cutting a conical enlargement in a cross hole which extends through the rounded external surface 102 of workpiece 104. For illustrative purposes only, the exemplary workpiece 104 to be drilled and countersunk is shown in cross-section as a tubular cylindrical component. However, the present invention is adapted to cut a concentrically tapered conical surface around the entire circumference of virtually any hole extending into or through a curved workpiece surface.

FIG. 4A illustrates countersink tool assembly 10 as ears 40 of insert 13 engage outer surface 102 of tubular workpiece 104 through a plane which is transverse to a longitudinally extending vertical plane 108 of tubular workpiece 104 after the cross hole has been drilled therethrough by twist drill 18. Vertical plane 108 also defines the center line of the drilled cross hole. At the point shown, countersink tool assembly 10 is at its lowest vertical displacement "A" relative to a stationary clamping surface 110. Therefore, planar contact surfaces 44 of ears 40 engage outer surface 102 at two diametrically opposite points along the transverse plane while countersink tool 20 is concentrically cutting the tapered surface 112 around the hole. As countersink tool assembly 10 rotates about its central axis of rotation 114, planar contact surfaces 44 of ears 40 follow the contour of outer surface 102 so as to maintain two diametrically opposed points or areas of contact therewith. Therefore, the central axis of rotation 114 of countersink 12 is maintained in colinear orientation with respect to vertical plane 108.

FIG. 4B shows insert 13 rotated approximately 90° to the position shown in FIG. 4A. Insert 13 is, at the position shown, vertically displaced to its highest point on the rounded contour of outer surface 102 as denoted as displacement "B". More particularly, contact surfaces 44 of ears 40 are aligned on the longitudinally extending vertical plane 108 of workpiece 104. As is apparent, the continuous engagement of ears 40 with curved surface 102 of workpiece 104 causes countersink tool assembly 10 to translate rectilinearly along central axis 114. More specifically, upon rotation of tool assembly 10, ears 40 continuously follow the contour of the hole to be chamfered between the two positions ("A" and "B") in a sinusoidally translational manner such that tool assembly 10 translates along center line 108 of the drilled hole. As such, a concentric frusto-conically tapered surface having a uniform cross-section is cut around the entire circumference of the drilled hole.

The present invention is adapted for use with virtually any power-driven hand drill or drill press apparatus which permits translational movement of the cutting tool upon application of a generally constant force on the workpiece. In addition, insert 13 of the present invention can also be used in association with most conventional multi-fluted countersinking tools. It is also contemplated that insert 13 may be attached to shank 14 of countersink 12 or virtually any other conventional fluted countersink utilizing alternative clamping means known in the art. It should be apparent that the axial relationship between cutting edges 28 on flutes 24 and planar contact surfaces 44 of ears 40 is important for determining the depth of the tapered surface and for adjusting insert 13 relative to the curved contour of the surface to be chamfered.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A countersink tool assembly of the type used with a power-driven drill apparatus for concentrically cutting a tapered surface around a hole drilled into a curved surface of a workpiece, said tool assembly comprising:

countersink tool means secured to the drill apparatus and adapted for rotation about a central axis for cutting the tapered surface, said countersink tool means having at least two flutes forming cutting edges thereon;

an insert member having a central aperture adapted to concentrically receive said countersink tool means therein;

locking means for securing said insert member to said countersink tool means such that said cutting edges extend axially out of said central aperture adjacent a first transverse end of said insert member; and contact surface means formed on said first transverse end of said insert member for engaging the curved surface of the workpiece, said contact surface means comprising a pair of diametrically opposed ears formed on said first transverse end surface of said insert member.

2. The countersink tool assembly of claim 1 wherein said ears extend radially inwardly into said central aperture of said insert member such that each of said ears is disposed within one of said at least two flutes of said countersink tool means.

3. The countersink tool assembly of claim 2 wherein said tool assembly is rotatably driven about its central axis by the power-driven drill such that said ears maintain contact at diametrically opposed positions on the curved surface of the workpiece during rotation of said tool assembly whereby said cutting edges cut a generally frusto-conical tapered surface having a relatively uniform cross-section concentrically around the hole drilled in the curved surface.

4. The countersink tool assembly of claim 3 wherein maintained contact of said ears with the curved surface causes said tool assembly to translate rectilinearly such that said central axis of said tool assembly is generally colinear with respect to a center line of the hole.

5. The countersink tool assembly of claim 3 wherein said insert member forms a chip groove on said first transverse end thereof.

6. The countersink tool assembly of claim 3 wherein said countersink tool means is a two fluted countersink tool adapted for permitting said diametrically opposed ears to extend radially inwardly into said flutes.

7. An insert member for use with a fluted countersink tool rotatable about a central axis for cutting a chamfer on a hole drilled into a curved surface, comprising:
   a body having front and rear ends and a central aperture extending therethrough which is sized to concentrically receive the fluted countersink tool therein;
   locking means for fixedly securing said body to the countersink tool both axially and rotationally so as to define a rotatable tool assembly with the countersink tool; and
   contact surface means formed on said front end of said body for maintaining abutting engagement with the curved surface when said tool assembly is rotatably driven about said central axis by a drill apparatus, said contact surface means comprising a pair of diametrically opposed ears formed on said front end of said body;
   said tool assembly reciprocating axially in response to changes in the contour of the curved surface abuttingly engaged by said contact surface means when said tool assembly is rotated for cutting a chamfered surface concentrically around the hole, said chamfered surface having a generally uniform cross-section around the periphery of the hole.

8. The insert member of claim 7 wherein said ears extend radially inwardly into said central aperture of said body such that each of said ears is disposed within one of a pair of diametrically opposed flutes formed on the countersink tool.

9. The insert member of claim 8 wherein said tool assembly is rotatably driven about its central axis by the drill apparatus such that said ears maintain contact at diametrically opposed positions on the curved surface during rotation of said tool assembly whereby cutting edges formed on the flutes of the countersink tool cut a generally frusto-conical tapered surface having a relatively uniform cross-section concentrically around the hole drilled in the curved surface.

10. The insert member of claim 9 wherein said body causes said tool assembly to translate such that said central axis of said tool assembly is generally oriented in colinear relationship with respect to the center line of the hole.

11. The insert member of claim 9 wherein said body forms a chip groove on said front end thereof.

12. A method of concentrically cutting a chamfer around a hole drilled into a curved exterior surface of a workpieces, said method comprising the steps of:
   securing a countersink tool assembly to a drill apparatus for rotation about a central axis, said countersink tool assembly having cutting means for cutting the chamfer upon rotation thereof, and contact surface means displaced from said cutting means and adapted to define a line of contact with the curved exterior surface of the workpiece during cutting of the chamfer, said contact surface means comprising a pair of diametrically opposed ears formed on said first transverse end surface of said insert member;
   securing the workpiece with respect to said central axis of said countersink tool assembly such that a centerline of the drilled hole is colinear with said central axis;
   rotating said countersink tool assembly about said central axis;
   engaging said contact surface means with the curved exterior surface of the workpiece;
   maintaining engagement between said contact surface means and said curved exterior surface such that rotation of said countersink tool assembly causes said countersink tool assembly to translate rectilinearily with respect to said centerline of the drilled hole whereby said cutting means cut the chamfer having a substantially uniform cross-section around the circumference of the drilled hole.

13. The method of claim 12 further comprising the step of drilling and chamfering the hole with said countersink tool assembly in a single operation.

* * * * *

UNITED STATES PATENT AND TRADEMARK OFFICE
CERTIFICATE OF CORRECTION

PATENT NO. : 5,066,172

DATED : November 19, 1991

INVENTOR(S) : Ollie C. Swim, Jr.

It is certified that error appears in the above-identified patent and that said Letters Patent is hereby corrected as shown below:

Column 2, line 38, after "drill" insert --18--.

Column 2, line 40, after "Countersink" insert --20--.

Signed and Sealed this

Ninth Day of March, 1993

Attest:

STEPHEN G. KUNIN

Attesting Officer

Acting Commissioner of Patents and Trademarks